(12) United States Patent
Congdon (10) Patent No.: US 9,188,280 B2
(45) Date of Patent: Nov. 17, 2015

(54) MOUNTING DEVICE

(75) Inventor: Jon M. Congdon, Sammamish, WA (US)

(73) Assignee: Industrial Revolution, Inc., Tukwila, WA (US)

( * ) Notice: Subject to any disclaimer, the term of this patent is extended or adjusted under 35 U.S.C. 154(b) by 112 days.

(21) Appl. No.: 13/565,763

(22) Filed: Aug. 2, 2012

(65) Prior Publication Data

US 2013/0193288 A1 Aug. 1, 2013

Related U.S. Application Data (60) Provisional application No. 61/514,473, filed on Aug. 2, 2011.

(51) Int. Cl.
| | | |
|---|---|---|
| *F16M 11/02* | (2006.01) | |
| *F16M 13/02* | (2006.01) | |
| *F16M 11/14* | (2006.01) | |
| *F16M 11/20* | (2006.01) | |

(52) U.S. Cl.
CPC ............ *F16M 13/022* (2013.01); *F16M 11/14* (2013.01); *F16M 11/2078* (2013.01); *Y10T 29/49826* (2015.01)

(58) Field of Classification Search
CPC . F16M 13/022; F16M 11/14; F16M 11/2078; Y10T 29/49826
USPC ............ 248/181.1, 181.2, 276.1, 288.31, 484
See application file for complete search history.

(56) References Cited

U.S. PATENT DOCUMENTS

| | | | | |
|---|---|---|---|---|
| 892,105 | A | * | 6/1908 | White ............................ 248/60 |
| 7,025,315 | B2 | * | 4/2006 | Carnevali .................. 248/276.1 |
| 7,090,181 | B2 | * | 8/2006 | Biba et al. ................ 248/288.31 |
| 8,608,120 | B2 | * | 12/2013 | Chen et al. .................. 248/181.1 |
| 8,960,629 | B2 | * | 2/2015 | Rizk et al. ...................... 248/481 |
| 2006/0000957 | A1 | * | 1/2006 | Carnevali .................. 248/181.1 |
| 2008/0296454 | A1 | * | 12/2008 | Carnevali ................. 248/231.71 |

* cited by examiner

*Primary Examiner* — Amy Sterling
(74) *Attorney, Agent, or Firm* — DWC Law Firm, P.S.; David Chen (57) ABSTRACT

A mounting device typically used for mounting line-of-site equipment, that allows easy, steady, and incremental rotation of the device in the vertical axis, and 360° rotation in the horizontal axis, while also allowing rotation and tilt of the mounted equipment.

13 Claims, 12 Drawing Sheets

MOUNTING DEVICE

CROSS REFERENCE TO RELATED APPLICATION(S)

This application claims the benefit of U.S. provisional patent application Ser. No. 61/514,473, filed Aug. 2, 2011, which is incorporated herein by reference in its entirety.

BACKGROUND

1. Technical Field

The present disclosure relates to mounting devices for use with equipment having line-of-sight requirements, such as, for example, optical and electronic equipment, and more particularly, for use with cameras, spotting scopes, camcorders, binoculars, or the like.

2. Description of Related Art

Mounting devices for cameras and other optical and electronic equipment allow the camera, or other equipment, to be moved into various positions and secured in order to hold the camera, or other equipment, steady for good, clear photos or accurate measurements. A variety of devices are available, such as single ball mounts, double ball mounts, post and arm ball mounts, segmented arm mounts, and multiple clamp devices Single ball mounts can be used to rotate a camera 360° and tilt it to various degrees. A single ball mount may also have a clamping device that holds the ball in a socket on one end and a support post on the other end, which allows the clamp to swing through 180° while the ball rotatable 360°. While single ball units operate smoothly and rotate a full 360°, they have a restricted tilt motion.

A double ball mount may incorporate adjustable locking arms or clamps between the balls, which allows both balls to move independently and allows the camera to be moved and locked into various positions. Double ball devices can be moved into almost any position, but they cannot be easily adjusted while in use (i.e., when a camera is mounted) since both balls are generally free at the same time making precision adjustments difficult.

Post and arm ball mounts allow the ball to rotate freely, but the arm can only rotate in one axis and not swivel. Segmented arms allow for adjustments in multiple positions, but do not lock securely when in the desired position. Multiple clamp devices allow for adjustments in many positions, but are not lightweight or portable enough to easily carry and use in the field.

BRIEF DESCRIPTION OF SEVERAL VIEWS OF THE DRAWINGS

FIG. 2 is partial detail view of a circumferential ridge on the ball portion of the second linking member in FIG. a.

DETAILED DESCRIPTION

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials associated with mounting devices have not been described in detail to avoid unnecessarily obscuring the descriptions of the embodiments of the disclosure.

In the present description, the terms "about" and "approximately" mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, which terms and variants thereof are intended to be construed as non-limiting.

Various embodiments in this disclosure are described in the context of use with cameras, and attachment clamps. However, as will be understood by those skilled in the art after reviewing this disclosure, various other line-of-sight devices, or other equipment, may be suitable for use with the disclosed mounting devices, and various other base mounts, such as, for example, tripods, may be substituted for the attachment clamp.

Figure 1A:
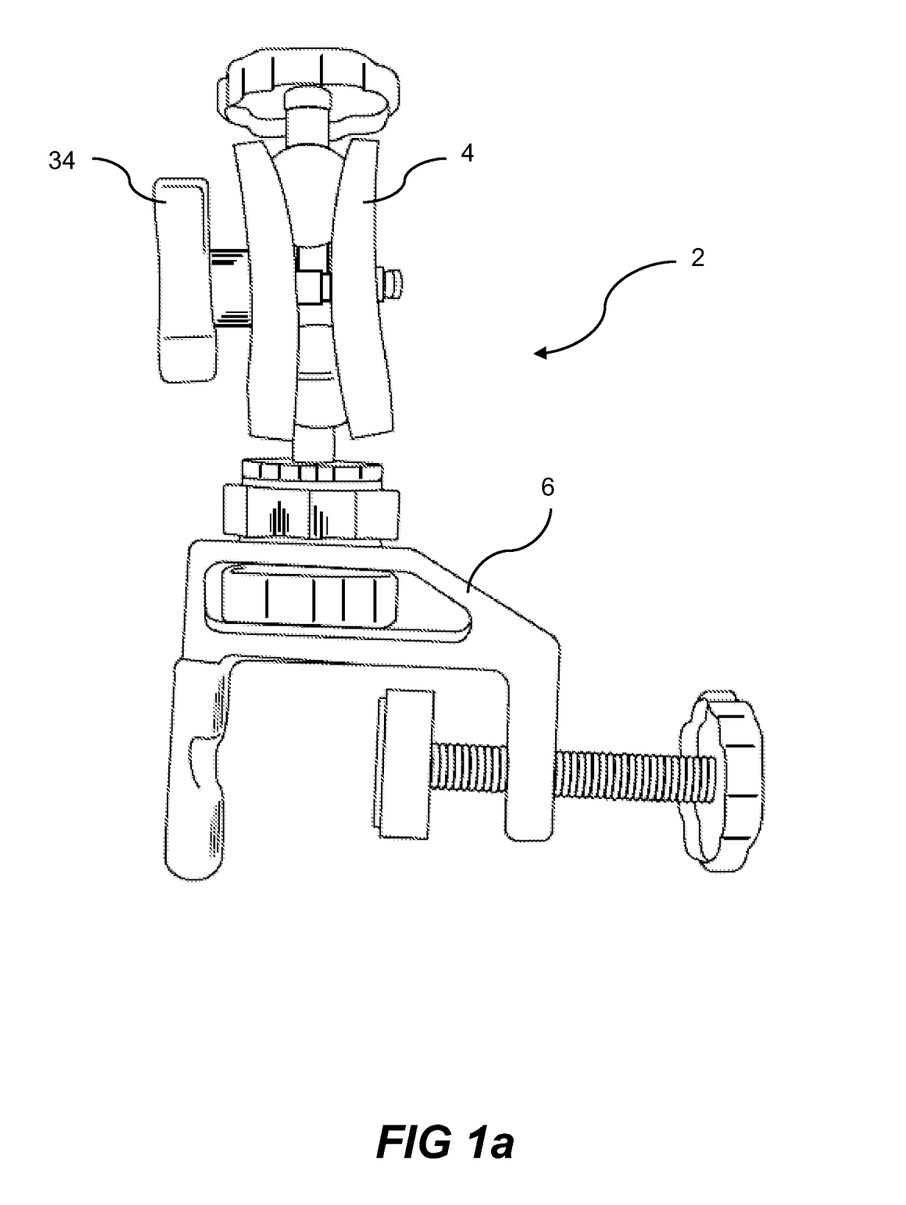
FIG. 1a is a side elevation view showing an example embodiment of the mounting device of the present invention, with an adjustment clamp assembly coupled to an attachment clamp assembly.
Figure 7:
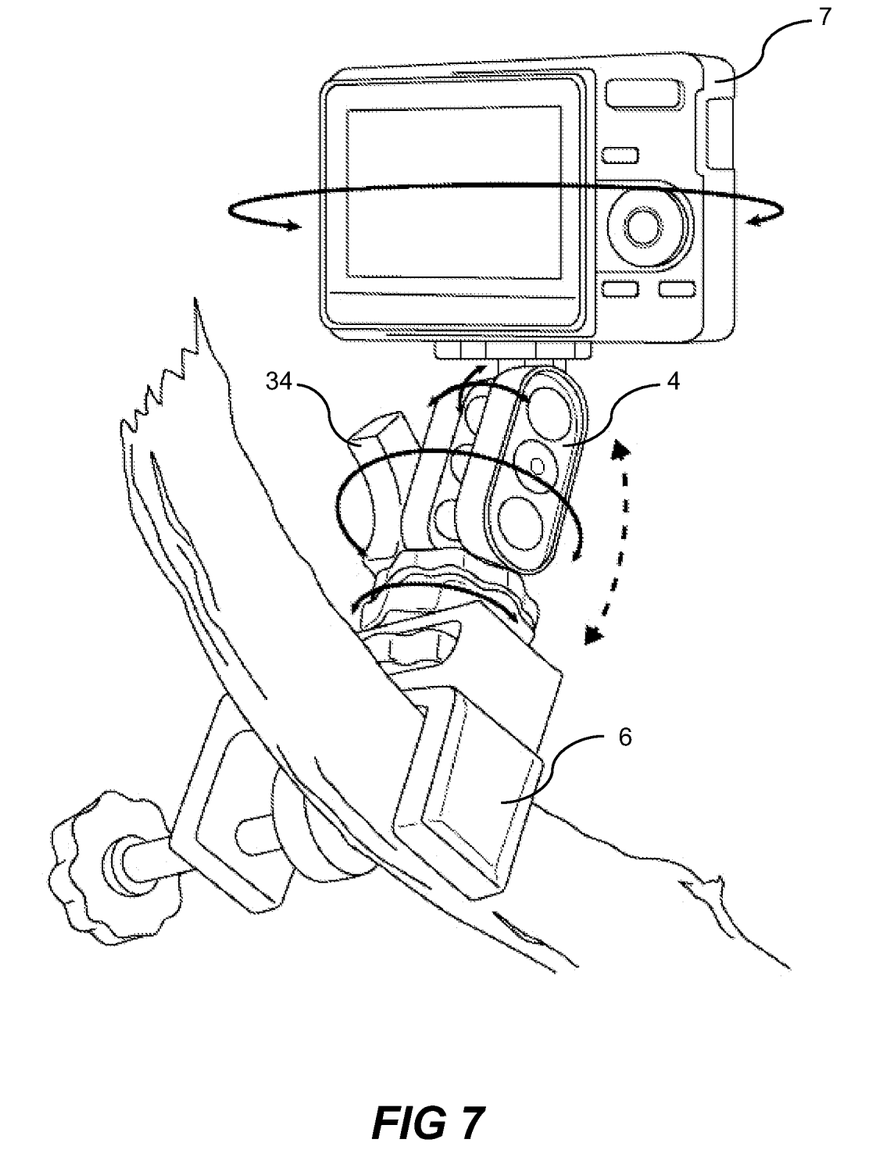
FIG. 7 is a perspective view of the mounting device of FIG. 1a, with the attachment clamp assembly clamped to a fixed position and a camera mounted on the adjustment clamp assembly.

As illustrated in FIGS. 1a & 7, in some embodiments, a mounting device 2 of the instant disclosure allows for mounting, for example, a camera 7 to an attachment clamp 6, and then accurately and precisely positioning the camera at various angles about a vertical and about a horizontal axis of the mounting device 2, independently or simultaneously, without having to adjust or move the attachment clamp 6. In other embodiments, the attachment clamp 6 can be replaced with a tripod or other base assembly.

An exemplary mounting device 2 of the instant disclosure is shown in FIG. 1a, which includes an adjustment clamp assembly 4 and an attachment clamp assembly 6.

Figure 1B:
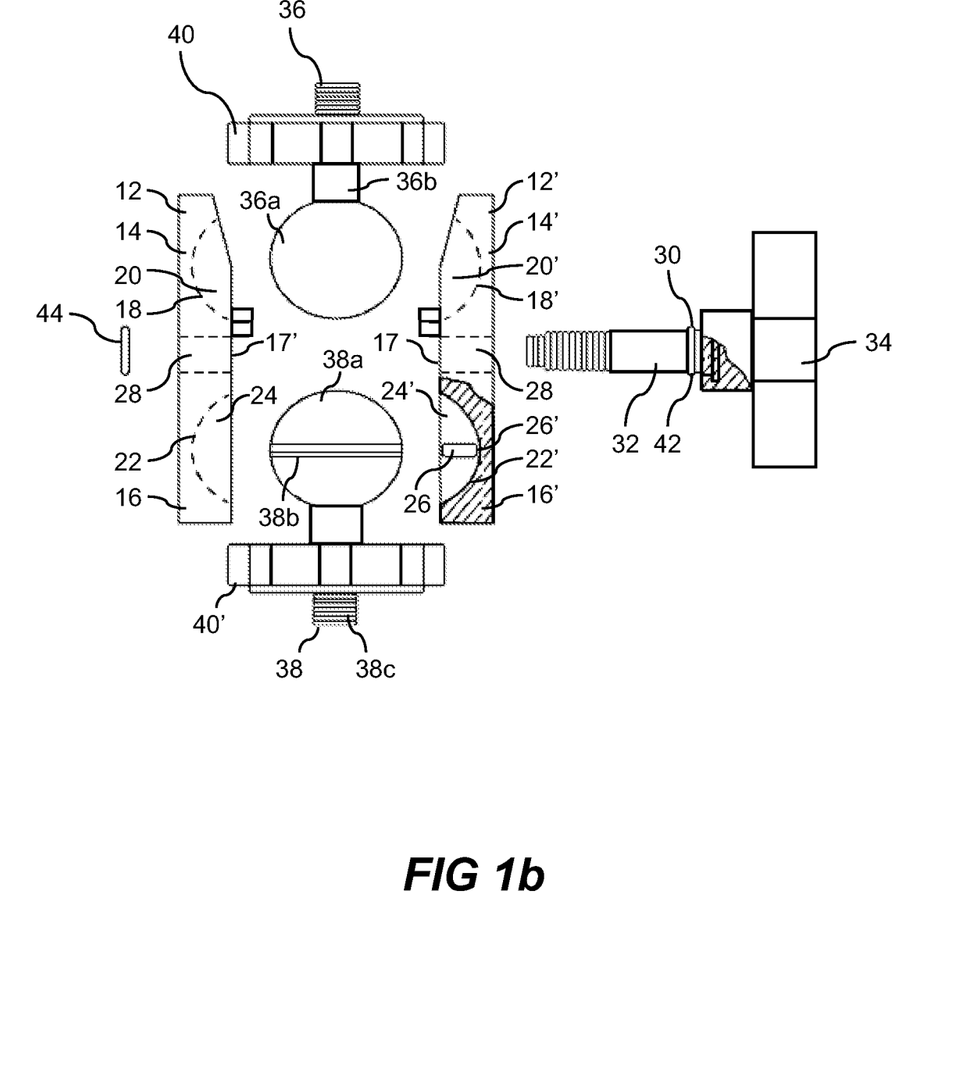
FIG. 1b is a side elevation view of the adjustment clamp assembly with clamp coupling member removed and the clamp members offset from the ball portions.
Figure 1C:
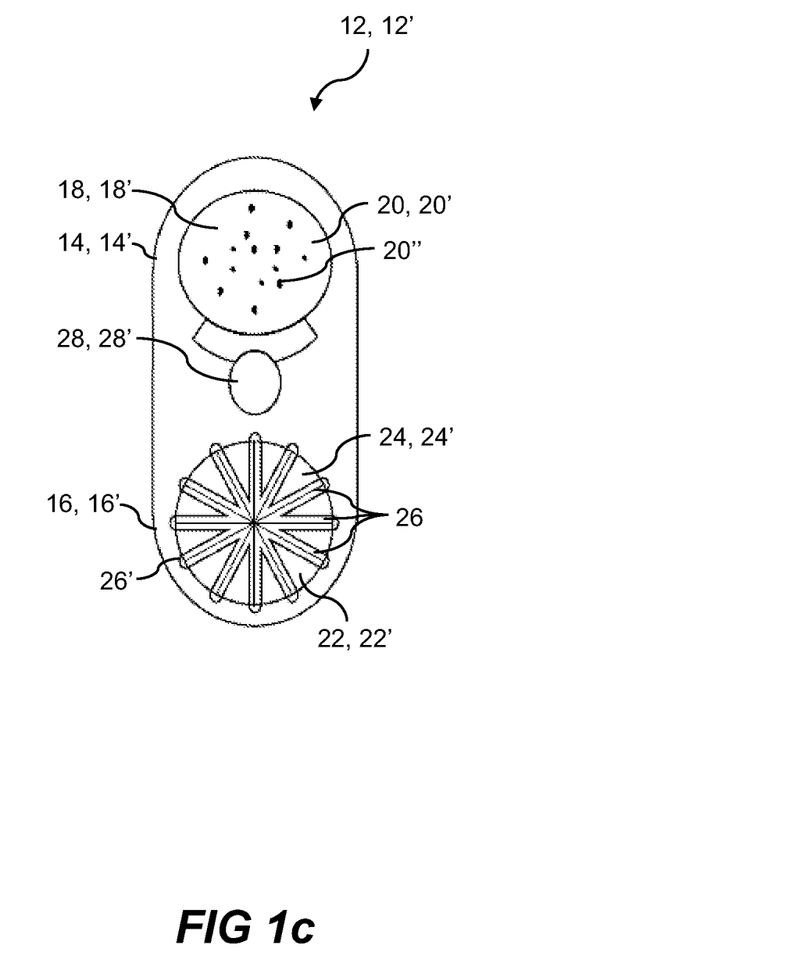
FIG. 1c is a side elevation view of a clamp member of the adjustment clamp assembly of FIG. 1b, as viewed from a position facing an inside surface of the clamp member.

Referring to FIG. 1b, the adjustment clamp assembly can have a first clamp member 12 and second clamp member 12', each clamp member having a first end portion 14, 14' and a second end portion 16, 16', and each end portion 14, 14', 16, 16' of the clamp members 12, 12' having an inner surface 17, 17' formed with a concave region 20, 20', 24, 24', or socket, having an inside surface that approximates a portion of a sphere. Referring to FIG. 1c, for example, the inside surfaces 18, 18' of the first concave regions 20, 20' on the first end portions 14, 14' can be smooth (or may have bumps formed thereon, such as, for example, circular bumps 20"), whereas the inside surfaces 22, 22' of the concave regions 24, 24' for the second end portions 16, 16' can comprise a plurality of grooves 26 that converge, or intersect, at a central portion 26' of the concave regions 24, 24' (as can be seen in FIGS. 1b, 1c, 4 & 5), or extend outwardly from the central portion toward and edge of the concave regions. The grooves can be circumferential in that they run along a surface of the concave regions, which themselves, can approximate a portion of a surface of a sphere. In some embodiments, the intersections 26' of the grooves 26 on the respective concave regions 24, 24' are disposed at diametrically opposed positions. Also, the intersections 26' of the grooves 26 can define points on an axis about which a second ball portion 38a can pivot, as described further below. In some embodiments, the circular bumps 20" can be, for example, about 0.015 inches high and about 0.2 inches in diameter at their base, and can have a surface that approximate a partial sphere.

Each of the clamp members 12, 12' can have an aperture 28, 28', which can be disposed at, or at about, a mid-point between the end portions 12, 12', 16, 16' of the clamp members. The apertures 28, 28' are alignable to allow a shaft 32 of a coupling member 30 to be inserted through the apertures 28, 28' to couple the clamp members 12, 12' together, as shown in FIG. 6.

Figure 6:
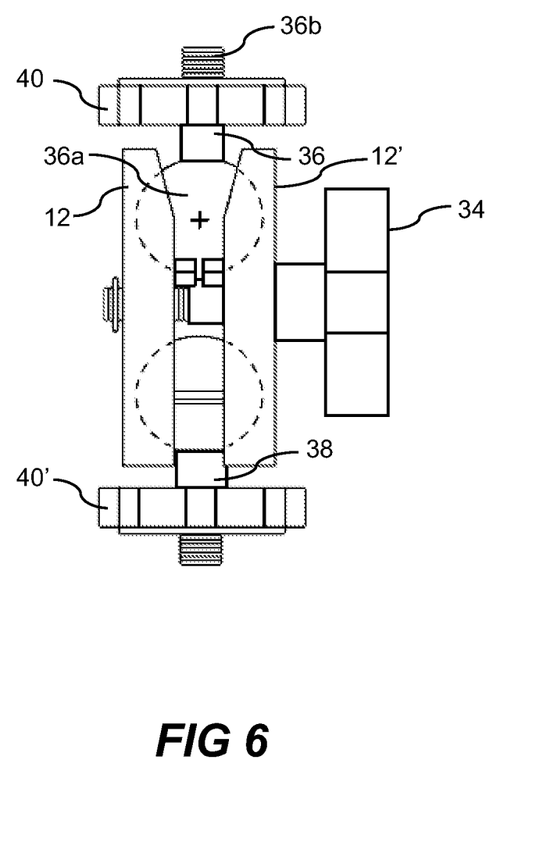
FIG. 6 is a side elevation view of the adjustment clamp assembly showing the coupling member inserted through the clamp members to clamp them together.

Referring now to FIGS. 1b & 6, in some embodiments, a first linking member 36 (having a ball portion 36a and an attached rod 36b extended from the surface of the ball portion) can be coupled to a circular grip 40 (e.g., thumbwheel). An end portion of the rod 36b, or other extension member, can extend outward past the circular grip 40 and this outwardly extended portion can be formed with an external threaded surface (for mating with a female internal thread surface). The rod 36b itself can be a standard ¼-20 camera mounting screw (i.e., a screw having a ¼ diameter and 20 threads per inch), or the extension member can be configured like the external threaded portion of such standard camera mounting screw. A camera 7, or other line-of-sight device can be mounted to this rob 36b or the extension member, as best seen in FIG. 7.

A second linking member 38 (having a ball portion 38a with a circumferential ridge 38b, and rod 38c extended from a surface of the ball portion 38a) can also be coupled to a circular grip 40' (e.g., thumbwheel). Again, an end portion of the rod 38c, or other extension member, can extend outward past the circular grip 40', and this outwardly extended portion can be formed with an external threaded surface (for mating with a female internal threaded surface). Again, the rod 38c itself can be a standard camera mounting screw like the type noted above, or the extension member can be configured like the external threaded portion of such standard camera mounting screw. In other embodiments, the "rod" is not threaded, including in embodiments where it can be molded as one part to the sphere or truncated sphere. The rod 38c, or extension member can be pivotably connected to a base, such as, for example, an attachment clamp 6, tripod (not illustrated), or other base. In some embodiments, a female threaded socket could be substituted for the rod 38c.

Figure 8A:
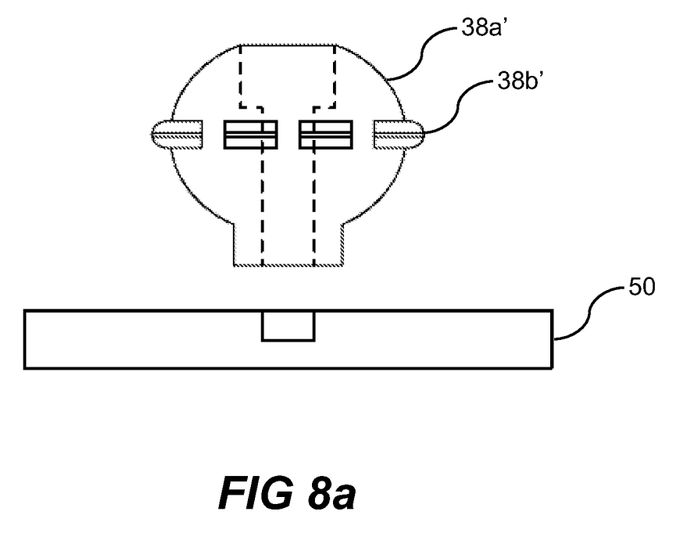
FIGS. 8a-8c are side elevation views showing various embodiments of the ball portion of the second linking member.
Figure 8B:
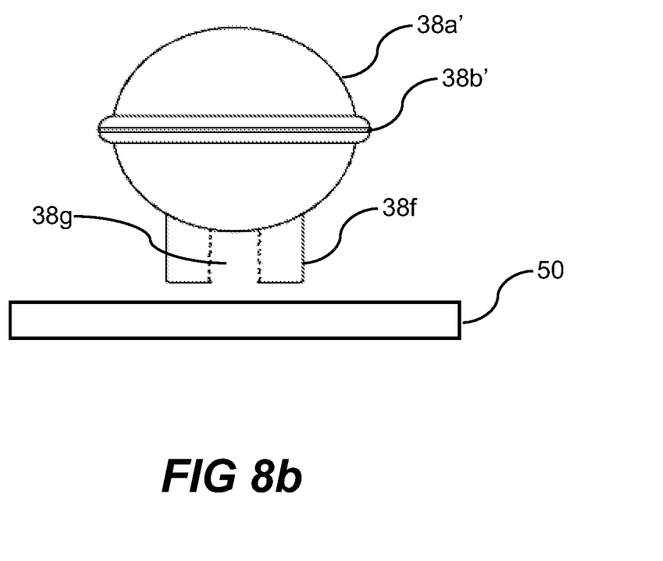
Figure 8C:
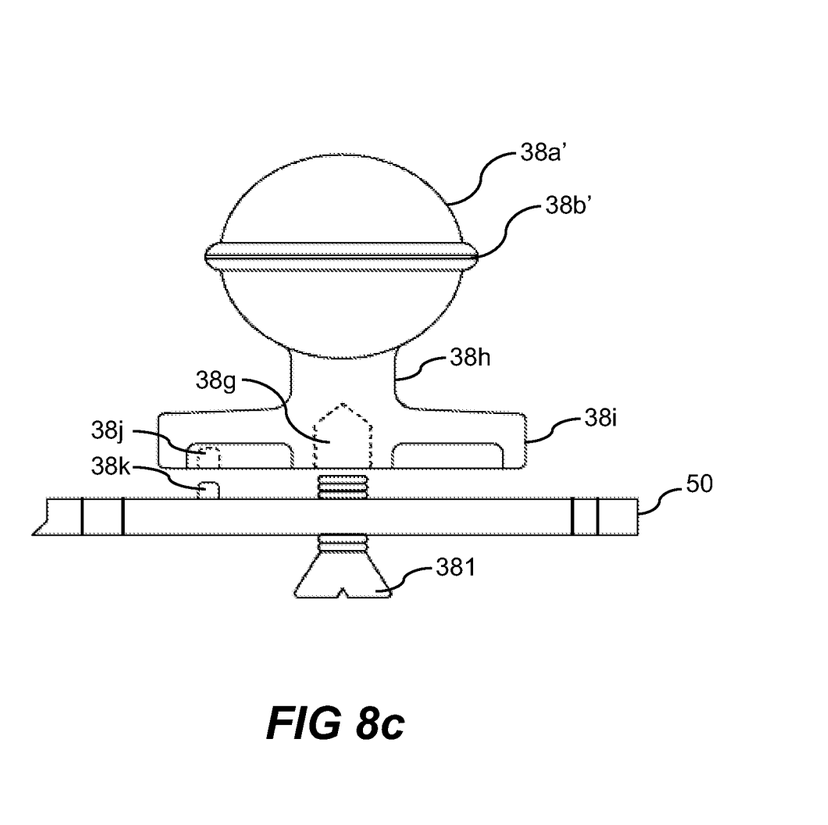

FIGS. 8a-8c show several alternative embodiments for the second linking member. For example, referring to FIG. 8a, the ball portion 38a' having a circumferential ridge 38b' could comprise a bolt hole 38f on an end portion of the ball, which can receive a bolt (no illustrated) or other attachment member, for use in attaching the ball portion 38a' to a coupling member (such as a female receiving member for the bolt) for attachment to a base mount 50 (e.g., attachment clamp or tripod). The circumferential ridge 38b' can be solid or continuous about the ball 38a', or it can be present or formed in segments, with gaps in between the segments (such as, for example, as illustrated in FIG. 8a). Referring to FIG. 8b, the ball portion 38a' having a circumferential ridge 38b' could comprise a cylindrical stub 38f, having an axial aperture 38g, which can be threaded, again for use in attaching the ball portion to a base mount 50 (such as a male threaded stub mount—not illustrated), directly or indirectly. Referring to FIG. 8c, the lower portion of the cylindrical stub 38h can be formed with a disc-like base 38i having an axial aperture 38g and a receiving indent 38j. The receiving indent 38j can receive a bead 38k, the bead being formed on a coupling member of the base mount 50 and matable within the indent 38j, to prevent the ball portion from turning and being unscrewed due to torque applied by the clamp members that are rotated about the ball portion. A screw 38l, or other attachment member, can be used to attach the base mount 50 to the ball portion 38a', by being mated with the aperture 38g, as will be appreciated by those skilled in the art after reviewing this disclosure.

In some embodiments, the ball portions 36a, 38a can be "clamped" within the concave regions 20, 20', 24, 24', of the clamp members 12, 12', and the clamp members tightened together using the knob 34, to secure the ball portions within the adjustable clamp assembly 2. The ball portions 36a, 38a provide two joints about which the clamp members 12, 12' can pivot and tilt to provide a greater range of positions than would be provided by a single ball joint. The concave regions 20, 20' of the first end portions 14, 14' of the clamp members can be aligned to receive respective surface portions of the ball portion 36a of the first linking member 36, with the ball portion 36a fitting snugly between inside surfaces 22 of the concave regions 20, 20'. Also, the concave regions 24, 24' of the second portion portions 16, 16' of the clamp members can be aligned to receive respective surface portions of the ball portion 38a of the second linking member 38, with the ball portion 38a fitting snugly between inside surfaces 22 of the concave regions 24, 24'.

The circumferential ridge 38b of the ball portion 38a can rest snuggly within respective grooves 26 of each of the concave regions 24, 24', or can be disposed between grooves on either concave region 24, 24'. When the clamp members 12, 12' are loosened, they can be tilted relative to the ball portion 38b of the second linking member 38, with an axis of tilt being defined by the groove 26 intersections 26'. In this manner, the clamp members can be titled about the ball portion 38a in toggling fashion, or "clicked", between high resistance positions and low resistance positions. In low resistance positions, the circumferential ridge 38b rests between corresponding grooves 26, where the ball portion 38a and can be easily slidable relative to the clamp members 12, 12' when the clamp members are loosened. In high resistance positions, when the circumferential ridge 38b rests within corresponding grooves 26, the ball portion 38a does not slide as easily as the ridge 38b must be pushed out of the grooves 26 (e.g., via sloped walls of the ridge 38b, as discussed below) in order for the ball portion 38a to move, even when the clamp members 12, 12' are in a loosened position, due to a biasing member that maintains force to bias the clamp members 12, 12' toward each other (as discussed further below).

Figure 2:
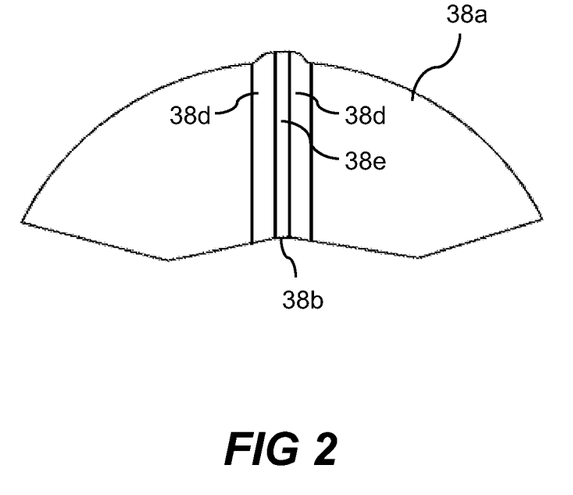
Figure 3:
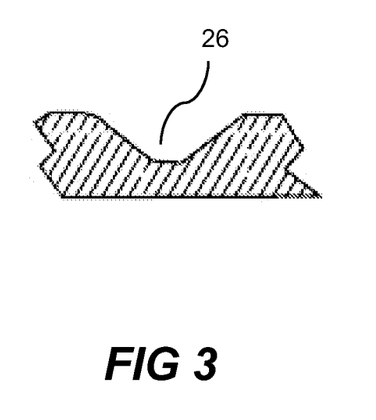
FIG. 3 is detail cross sectional view, viewed longitudinally along an example groove of the present disclosure, such as those grooves shown on the concave regions of the second end portions of the clamp members in FIGS. 1b and 1c.
Figure 4:
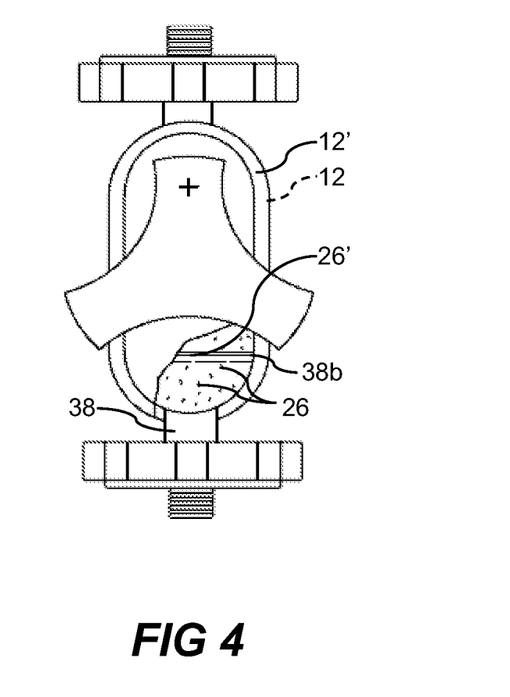
FIG. 4 is a partial cutaway view showing the adjustment clamp assembly of FIG. 1b, with the coupling member inserted through the clamp members to clamp them together, and further showing the circumferential ridge and grooves.
Figure 5:
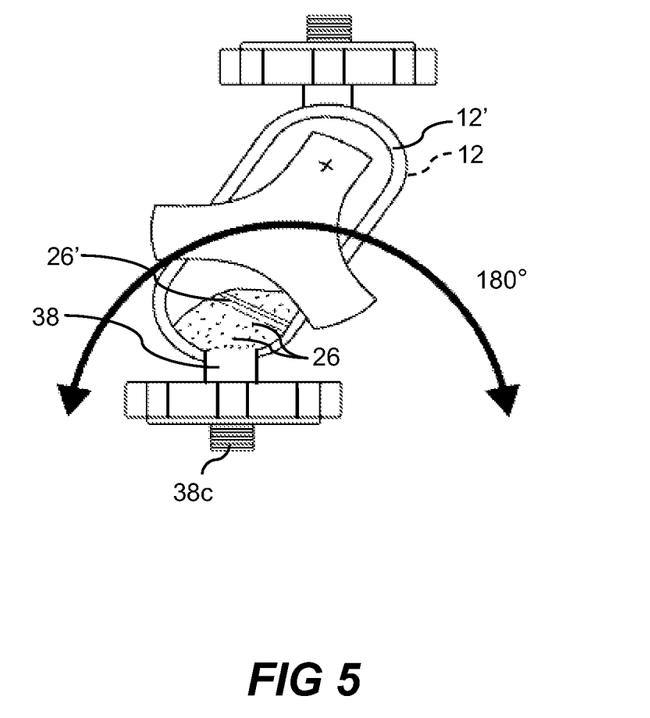
FIG. 5 is a partial cutaway view showing the adjustment clamp assembly of FIG. 4, with the clamp members titled about 30 degrees from the position in FIG. 4.

Referring to FIG. 2, in some embodiments, the circumferential ridge 38b can have slopped converging walls 38d, on either side of the ridge 38b, that converge toward and terminate at an apex, which can be an edge of a flat 38e. The width and height of the ridge can be sized to fit snugly within the grooves 26. Referring to FIG. 3, the grooves 26 can be sized in width and depth to snugly receive the circumferential ridge 38b when the ridge is aligned within the grooves 26. In other embodiments, the ridge 38b can have other shapes, such as, for example, a U-shaped lateral cross-section or a V-shaped lateral cross section.

Referring to FIGS. 1b & 6, in some embodiments, a biasing member 42, such a coil spring, is fitted about a portion of the shaft 32 of the coupling member 30. The biasing member 42 can be positioned at a base of the shaft 32 against an inside surface of the knob 34. The shaft 32 can be inserted through the aperture 28' of the second clamp member 12' and align within the aperture 28 of the first clamp member 12. The aperture 28 of the first clamp member 12 can be lined with internal threads to mate with a threaded end portion of the shaft 32, allowing the shaft 32 to screw into, or out of, the aperture 28, to permit manual tightening or loosening of the clamp members 12, 12' relative to one another by turning the knob 34. In some embodiments, the travel of the shaft 32 is limited to prevent completely removing the shaft from the aperture 28. Also, in some embodiments, when the knob is turned to loosen the clamp members 12, 12' relative to one another, the biasing member 42 continues to bias the second clamp member 12' toward the first clamp member 12, to hold the ball portions 36a and 38b snuggly within the concave regions 20, 20', 24, 24'. In this way, the knob can be loosened sufficiently to allow the clamp members 12, 12' to toggle relative to the ball portion 38a of the second linking member 38, as described above, while the biasing member forces the clamp members 12, 12' together with sufficient force to impart resistance to movement of the ball portion 38a when the ridge 38b is disposed within the grooves 26 (e.g., in "high resistance positions" as discussed above).

The second linking member 38 can be pitovably attached to, among other things, an attachment clamp 6, tripod or other base assembly. As shown in FIGS. 1a and 7, illustrating the second linking member 38 attached to an attachment clamp 6, the clamp members 12, 12' can swivel about the second linking member by 360 degrees in a horizontal plane (e.g., perpendicular to an axis of the attachment rod 38c) and the clamp members 12, 12' can incrementally tilt about a horizontal axis, or within a vertical plane. A camera or other device can be mounted on the first linking member 36, and then the first linking member 36 can either be kept in the vertical position, tilted, or rotated.

In some embodiments, the clamp members 12, 12' can be toggled relative to the second linking member 38 through different positions off vertical at increments of, for example, 10, 15, 18, 20, 22.5, 30, 36, 45, 60, or 90 degrees, or any other increments. In some embodiments, such as that displayed in FIGS. 4 & 5, the clamp members 12, 12' can be toggled relative to the second linking member through a full 180 degrees, in 30 degree increments between toggles, along a vertical plane (e.g., parallel with the axis of the rod 38c extending from the lower thumbwheel 40'). Regardless of the tilt angle at which the clamp members 12, 12' are positioned relative to the second linking member 38, the clamps member 12, 12' can maintain such tilt angle in a high resistance position and can then be pivoted 360 degrees in the horizontal plane (e.g., relative to rod 38c, or an axis about which they swivel). This allows for free adjustment of the first linking member relative to the clamp members 12, 12' (as generally illustrated in FIG. 7), without the clamp members 12, 12' spontaneously tilting by rotation with respect to the second linking member 38, while also allowing, for example, a mounted camera or other equipment to be panned (rotated) 360° in the horizontal axis. When a position is selected, the knob 34 can be tightened to lock both ball joints in static position relative to the clamp members 12, 12'.

In some embodiments, the second linking member comprises a spherical head and a rod extending from the head surface, wherein the spherical head comprises a smooth peripheral surface with a ridge on the circumference of the spherical head. In further embodiments, the spherical head may be a truncated sphere or may be replaced by a disc having edge configuration that is similar to the ridge 38b. In still further embodiments, the ridge may be continuous and extend around the entire circumference of the spherical head (essentially forming a raised ring-like protrusion on the spherical surface) or the ridge may be discontinuous, or have sections, at spaced apart portions of the sphere along the same line as that of the disclosed ridge 38b.

Although specific embodiments of the present disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described structures and methods can omit some elements or acts, can add other elements or acts, or can combine the elements or execute the acts in a different order than that illustrated, to achieve various advantages of the disclosure. These and other changes can be made to the disclosure in light of the above detailed description.

What is claimed is:
1. A mounting device, comprising:
a first linking member comprising a first sphere and a rod extending from the first sphere;
a second linking member comprising a second sphere and a second rod extending from the second sphere, wherein the second sphere comprises a circumferential ridge that is continuous and extends around an entire circumference of the second sphere on a smooth surface of the second sphere;
an adjustable clamp assembly comprising a first clamp member and second clamp member, each clamp member having a first concave region and a second concave region, each concave region approximating a portion of a surface of one of the spheres, wherein an inner surface of each of the second concave regions comprises a plurality of circumferential grooves that converge at a central portion of the second concave region and wherein each of the grooves extends from the central portion outward toward an edge of the second concave region;
wherein the first and second clamp members are coupled together by an adjustable coupling member with the inner surfaces of the second concave regions of the clamp members being mutually opposed to form sockets that receive the second sphere, and with additional inner surfaces of the first concave regions of the clamp members being mutually opposed to form sockets that receive the first sphere;
wherein the circumferential ridge of the second sphere rests within at least one of the plurality of grooves on each of the second concave regions;
a biasing member contacting at least one of the first clamp member and second clamp member and biasing the first clamp member toward the second clamp member; and
a base to which the adjustable clamp assembly is pivotably attached.

2. The mounting device of claim 1 wherein the clamp members can be tilted up to a range of 180 degrees with respect to the second sphere.

3. The mounting device of claim 1 wherein the clamp members can be tilted through a plurality of toggled increments with respect to the second sphere, with each increment beginning in a high resistance position and ending in a high resistance position, wherein the circumferential ridge is disposed within at least one of the plurality of grooves in each of the second concave regions in each of the high resistance positions.

4. The mounting device of claim 3 wherein each increment represents 10, 15, 18, 20, 22.5, 30, 36, 45, 60, or 90 degrees of tilt from a vertical axis aligned with the second rod.

5. The mounting device of claim 1 wherein the inner surface of each of the second concave regions having grooves comprises 18, 12, 10, 9, 8, 6, 5, 4, 3, or 2 circumferential grooves.

6. The mounting device of claim 1 wherein the adjustable clamp assembly can be pivoted 360 degrees about the second linking member.

7. The mounting device of claim 1 wherein the first linking member can be pivoted 360 degrees about a longitudinal axis of the first linking member within the adjustable clamp assembly.

8. The mounting device of claim 1 wherein the circumferential ridge has sloped sidewalls that converge toward an apex.

9. The mounting device of claim 1 wherein the ridge is a segmented ridge extending circumferentially about the ball portion, with gaps between each segment.

10. The mounting device of claim 1 wherein at least one of the linking members comprises a disc-like base having an axial aperture, and a receiving indent.

11. A mounting device for use in mounting an optical device to a base mount, comprising:
   a first linking member comprising a first ball portion and a first rod extending from the first ball portion;
   a second linking member comprising a second ball portion and a second rod extending from the second ball portion, wherein the second ball portion comprises a circumferential ridge extending about an entire spherical circumference of a surface of the second ball portion, wherein the circumferential ridge is the only circumferential ridge on the surface;
   an adjustable clamp assembly comprising a first clamp member and a second clamp member, each clamp member having plurality of concave regions, wherein an inner surface of at least one of the concave regions on each of the first clamp member and second clamp member comprises a plurality of circumferential grooves that each converge at a central portion of the at least one of the concave regions and that each extend from the central portion of the at least one of the concave regions outward to an edge of the at least one of the concave regions; and
   wherein an adjustable coupling member couples the first clamp member and second clamp members together with the inner surfaces of the at least one of the concave regions on each of the first clamp member and second clamp member being mutually opposed to form sockets for receiving the second ball portion, and with additional inner surfaces of concave regions on each of the first clamp member and second clamp member being mutually opposed to form sockets for receiving the first ball portion, wherein the circumferential ridge is disposed within at least one of the plurality of grooves on each of the inner surfaces.

12. The mounting device of claim 11 wherein the circumferential ridge is segmented with gaps between each segment.

13. The mounting device of claim 11 wherein an inner surface of at least one of the concave regions comprises a plurality of bumps.

* * * * *